United States Patent
Yi (10) Patent No.: US 11,947,842 B2
(45) Date of Patent: Apr. 2, 2024

(54) METHOD FOR WRITING DATA IN APPEND MODE, DEVICE AND STORAGE MEDIUM

(71) Applicant: Beijing Baidu Netcom Science Technology Co., Ltd., Beijing (CN)

(72) Inventor: Zhengli Yi, Beijing (CN)

(73) Assignee: Beijing Baidu Netcom Science Technology, Co., Ltd., Beijing (CN)

( * ) Notice: Subject to any disclaimer, the term of this patent is extended or adjusted under 35 U.S.C. 154(b) by 34 days.

(21) Appl. No.: 17/896,811

(22) Filed: Aug. 26, 2022

(65) Prior Publication Data
US 2022/0405020 A1 Dec. 22, 2022

(30) Foreign Application Priority Data
Dec. 30, 2021 (CN) .......................... 202111644410.6

(51) Int. Cl.
G06F 3/06 (2006.01)
(52) U.S. Cl.
CPC .......... *G06F 3/0659* (2013.01); *G06F 3/0604* (2013.01); *G06F 3/0647* (2013.01); *G06F 3/0676* (2013.01)
(58) Field of Classification Search
CPC .... G06F 3/0659; G06F 3/0604; G06F 3/0647; G06F 3/0676
See application file for complete search history.

(56) References Cited

U.S. PATENT DOCUMENTS

| 2007/0061529 A1* | 3/2007 | Eastman ............. G06F 11/2087 711/170 |
| 2016/0283537 A1 | 9/2016 | Chen et al. |
| 2017/0293439 A1 | 10/2017 | Basham et al. |
| 2021/0248119 A1 | 8/2021 | Li |

FOREIGN PATENT DOCUMENTS

| CN | 101644996 A | 2/2010 |
| CN | 106547490 A | 3/2017 |
| CN | 108255408 A | 7/2018 |
| CN | 109213772 A | 1/2019 |
| CN | 110502452 A | 11/2019 |
| CN | 111625191 A | 9/2020 |

(Continued)

OTHER PUBLICATIONS

Takashi Meguro, PostgreSQL Classroom for Database Beginners, Apr. 17, 2020.

*Primary Examiner* — Jae U Yu
(74) *Attorney, Agent, or Firm* — Knobbe, Martens, Olson & Bear, LLP (57) ABSTRACT

The present disclosure provides a method and apparatus for writing data in an append mode, a device and a storage medium. The present disclosure relates to the field of cloud storage technology, and can be applied to a cloud platform. The method includes: acquiring to-be-written data, and writing the to-be-written data into a magnetic disk; writing first index information of the to-be-written data in a memory; storing, in response to determining that the number of pieces of second index information is greater than a first preset threshold, the second index information into storage hardware, the second index information including the first index information; and writing first identifier information corresponding to the second index information in the memory.

20 Claims, 4 Drawing Sheets

(56) References Cited

FOREIGN PATENT DOCUMENTS

| | | |
|---|---|---|
| CN | 112114753 A | 12/2020 |
| CN | 112540731 A | 3/2021 |
| CN | 113127382 A | 7/2021 |
| JP | 2005-293774 | 10/2005 |
| JP | 2009-531799 | 9/2009 |

* cited by examiner

METHOD FOR WRITING DATA IN APPEND MODE, DEVICE AND STORAGE MEDIUM

CROSS-REFERENCE TO RELATED APPLICATION

The present application claims the priority of Chinese Patent Application No. 202111644410.6, titled "METHOD AND APPARATUS FOR WRITING DATA IN APPEND MODE, DEVICE AND STORAGE MEDIUM", filed on Dec. 30, 2021, the content of which is incorporated herein by reference in its entirety.

TECHNICAL FIELD

The present disclosure relates to the field of computing, specifically to the field of cloud storage technology, and particularly to a method for writing data in an append mode, a device and a storage medium.

BACKGROUND

At present, the performance of writing in an append mode of mainstream non-volatile storage media (SSD/HDD) is much higher than that of random writing. Therefore, the storage systems with writing in an append mode can often give full play to the performance of hardware, and thus, many storage systems adopt methods of writing in disks in an append mode to improve the writing efficiency of the systems. However, since the writing in the append mode changes the positions of the original data, it is required to maintain mapping relationships from logical addresses to physical addresses, i.e., index information. The approach of storing and maintaining the index information will seriously affect the access performance of the systems.

SUMMARY

The present disclosure provides a method for writing data in an append mode, a device and a storage medium.

According to the first aspect of the present disclosure, a method for writing data in an append mode is provided. The method includes: acquiring to-be-written data, and writing the to-be-written data into a magnetic disk; writing first index information of the to-be-written data in a memory; storing, in response to determining that the number of pieces of second index information is greater than a first preset threshold, the second index information into storage hardware, the second index information including the first index information; and writing first identifier information corresponding to the second index information in the memory.

According to the second aspect of the present disclosure, an electronic device is provided. The electronic device includes: at least one processor; and a storage device communicated with the at least one processor, where the storage device stores an instruction executable by the at least one processor, and the instruction, when executed by the at least one processor, causes the at least one processor to perform the method as described in any implementations of the first aspect.

According to the third aspect of the present disclosure, a non-transitory computer readable storage medium storing a computer instruction is provided. The computer instruction, when executed by a computer, causes the computer to perform the method as described in any implementations of the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
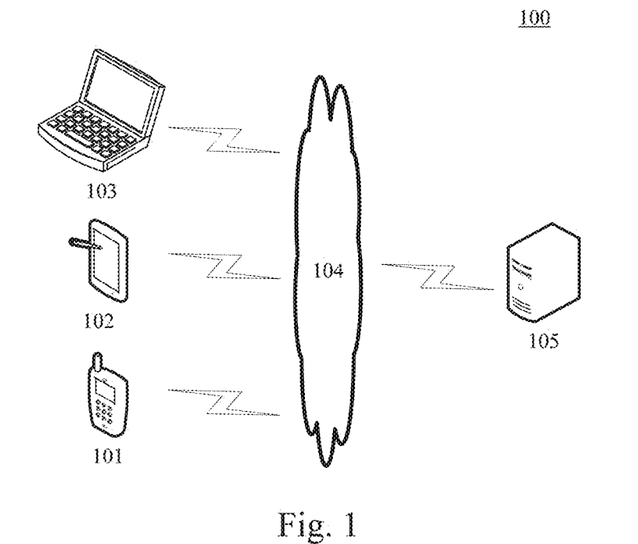
FIG. 1 is a diagram of an exemplary system architecture in which the present disclosure may be applied.

FIG. 1 illustrates an exemplary system architecture 100 in which an embodiment of a method for writing data in an append mode or an apparatus for writing data in an append mode according to the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104 to receive or send a message, etc. Various client applications may be installed on the terminal devices 101, 102 and 103.

The terminal devices 101, 102 and 103 may be hardware or software. When being the hardware, the terminal devices 101, 102 and 103 may be various electronic devices, the electronic devices including, but not limited to, a smartphone, a tablet computer, a laptop portable computer, a desktop computer, etc. When being the software, the terminal devices 101, 102 and 103 may be installed on the above listed electronic devices. The terminal devices may be implemented as a plurality of pieces of software or a plurality of software modules, or as a single piece of software or a single software module, which is not specifically limited here.

The server 105 may provide various services. For example, the server 105 may analyze and process to-be-written data acquired from the terminal devices 101, 102 and 103, and generate a processing result (e.g., writing index information of the to-be-written data in a memory).

It should be noted that the server 105 may be hardware or software. When being the hardware, the server 105 may be implemented as a distributed server cluster composed of a plurality of servers, or as a single server. When being the software, the server 105 may be implemented as a plurality of pieces of software or a plurality of software modules (e.g., pieces of software or software modules for providing a distributed service), or as a single piece of software or a single software module, which is not specifically limited here.

It should be noted that the method for writing data in an append mode provided by the embodiments of the present disclosure is generally performed by the server 105. Correspondingly, the apparatus for writing data in an append mode is generally provided in the server 105.

It should be appreciated that the numbers of the terminal devices, the network, and the server in FIG. 1 are merely illustrative. Any number of terminal devices, networks, and servers may be provided based on actual requirements.

Figure 2:
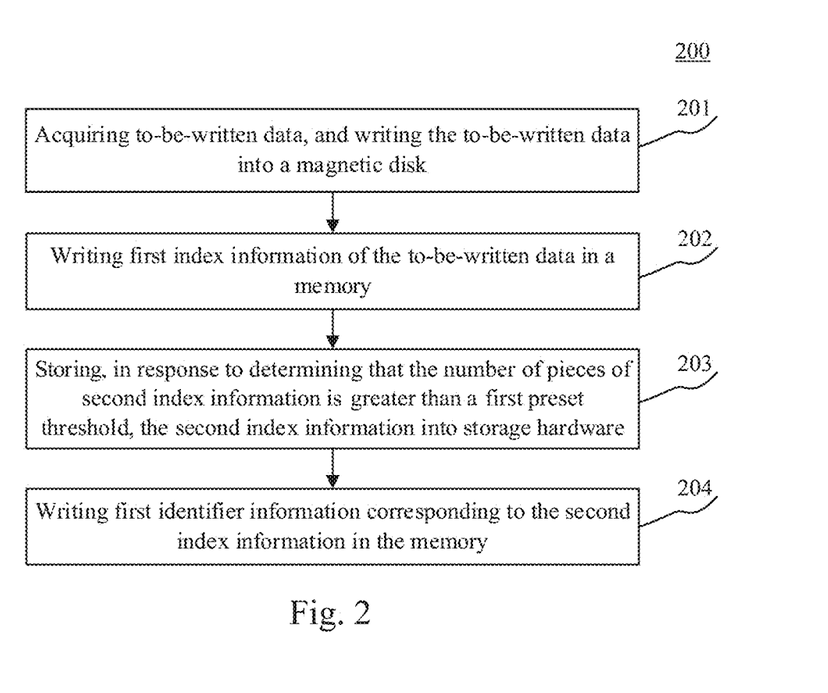
FIG. 2 is a flowchart of an embodiment of a method for writing data in an append mode according to the present disclosure.

Further referring to FIG. 2, FIG. 2 illustrates a flow 200 of an embodiment of a method for writing data in an append mode according to the present disclosure. The method for writing data in an append mode includes the following steps.

Step 201, acquiring to-be-written data, and writing the to-be-written data into a magnetic disk.

In this embodiment, an executing body (e.g., the server 105 shown in FIG. 1) of the method for writing data in an append mode may acquire the to-be-written data, and write the to-be-written data into the magnetic disk, and specifically, the executing body may write the to-be-written data into the magnetic disk in an append mode. Here, the to-be-written data may be log data generated in real time by a user behavior. The executing body acquires the log data and writes the log data into the log stream of the magnetic disk in the append mode. Here, the magnetic disk refers to a storage device storing data using a magnetic recording technology. The log stream of the magnetic disk (i.e., the log file system) stores the data written into the magnetic disk, which tracks the change of the magnetic disk content with a separate log file. Since there is already data in the magnetic disk, and it is desirable to write new data into the magnetic disk and retain the original data at the same time, the executing body writes the to-be-written data into the magnetic disk in the append mode.

Step 202, writing first index information of the to-be-written data in a memory.

In this embodiment, the executing body writes the first index information of the to-be-written data in the memory. Since the writing in the append mode changes the position of the original data, it is required to maintain a mapping relationship from a logical address to a physical address, that is, the index information. After writing the to-be-written data into the magnetic disk in the append mode, the executing body writes the first index information of the to-be-written data in the memory. Thus, the mapping relationship of the to-be-written data from the logical address to the physical address is established. In some cases, after writing the first index information of the to-be-written data in the memory, the executing body ends the process of writing the data in the append mode, thereby ensuring the speed of writing the data.

Step 203, storing, in response to determining that the number of pieces of second index information is greater than a first preset threshold, the second index information into storage hardware.

In this embodiment, after writing the to-be-written data into the magnetic disk and writing the first index information of the to-be-written data in the memory, the executing body determines whether the number of the pieces of second index information is greater than the first preset threshold. Here, the second index information includes at least the first index information. That is, the second index information may further include a plurality of pieces of index information other than the first index information, and the number of the pieces of index information included in the second index information may be set according to actual requirements. The first preset threshold may be set according to actual requirements, and is not limited by the embodiments of the present disclosure. In the situation where the number of the pieces of second index information is greater than the first preset threshold, the second index information is stored into the storage hardware. Here, the index information refers to the mapping relationship between the logical address of data and the real physical address of the data in the magnetic disk. Here, the storage hardware may be an NVRAM (Non-Volatile Random Access Memory), or may be other storage hardware, which is not specifically limited in this embodiment.

In the existing technology, an approach is to store all the index information into the memory. However, since the memory is volatile storage, the recovery of the index information takes a long time when the system is restarted, and at the same time, the number of pieces of the index information is limited by the memory capacity. An other approach is to persistently store the index information into the index area of the magnetic disk, but in this approach, a random writing process will be introduced, resulting in an increase in delay. In addition, there is another approach in which data and index information share a data stream, that is, both the data and the index information are written into the storage system in an append mode, thereby eliminating the random writing in the magnetic disk. However, in this approach, the access performance of the index information is dependent on the performance of the storage medium, causing the read/write to be delayed and unstable.

Based on this, the storage hardware is introduced in this embodiment. In the situation where the number of the pieces of second index information in the memory is greater than the first preset threshold, the second index information is stored into the storage hardware, thereby ensuring the ultra-low delay in accessing the index information and improving the overall performance of the storage system.

After the second index information in the memory is stored into the storage hardware, the storage space of the memory may be freed up, and thus, it is possible to continue to write the index information of the appended data in the memory. When the number of the pieces of second index information is greater than the first preset threshold again, the second index information can also be written into the storage hardware again according to the above operation.

Step 204, writing first identifier information corresponding to the second index information in the memory.

In this embodiment, the executing body writes the first identifier information corresponding to the second index information in the memory, i.e., writes the first identifier information pointing to the second index information in the storage hardware. That is, after storing the second index information into the storage hardware, the executing body writes, in the memory, the first identifier information pointing to the second index information stored in the storage hardware, and then releases a memory occupied by the second index information in the memory, so that it can be ensured that the corresponding second index information can be found according to the first identifier information. Thus, the correctness of reading and writing data is guaranteed, and the occurrence of a situation where the corresponding data in the magnetic disk cannot be read according to the identifier information is avoided.

According to the method for writing data in an append mode provided in the embodiment of the present disclosure, first, the to-be-written data is acquired and the to-be-written data is written into the magnetic disk. Then, the first index information of the to-be-written data is written in the memory. Next, in response to determining that the number of the pieces of second index information is greater than the first preset threshold, the second index information is stored into the storage hardware, the second index information including the first index information. Finally, the first identifier information corresponding to the second index information is written in the memory. According to the method for writing data in an append mode in this embodiment, in the situation where it is determined that the number of the pieces of second index information in the memory is greater than the first preset threshold, the second index information is stored into the storage hardware, and the first identifier information pointing to the second index information is written in the memory, thereby releasing the memory space and avoiding the problem that the memory space is insufficient. Meanwhile, by storing the index information into the storage hardware, the random writing can be completely eliminated, and thus, the hardware performance is fully utilized, which reduces the delay in accessing the index information, and greatly improves the speed of writing user data, thereby improving the overall performance of the storage system.

In the technical solution of the present disclosure, the collection, storage, use, processing, transmission, provision, disclosure, etc. of the personal information of a user all comply with the provisions of the relevant laws and regulations, and do not violate public order and good customs.

Figure 3:
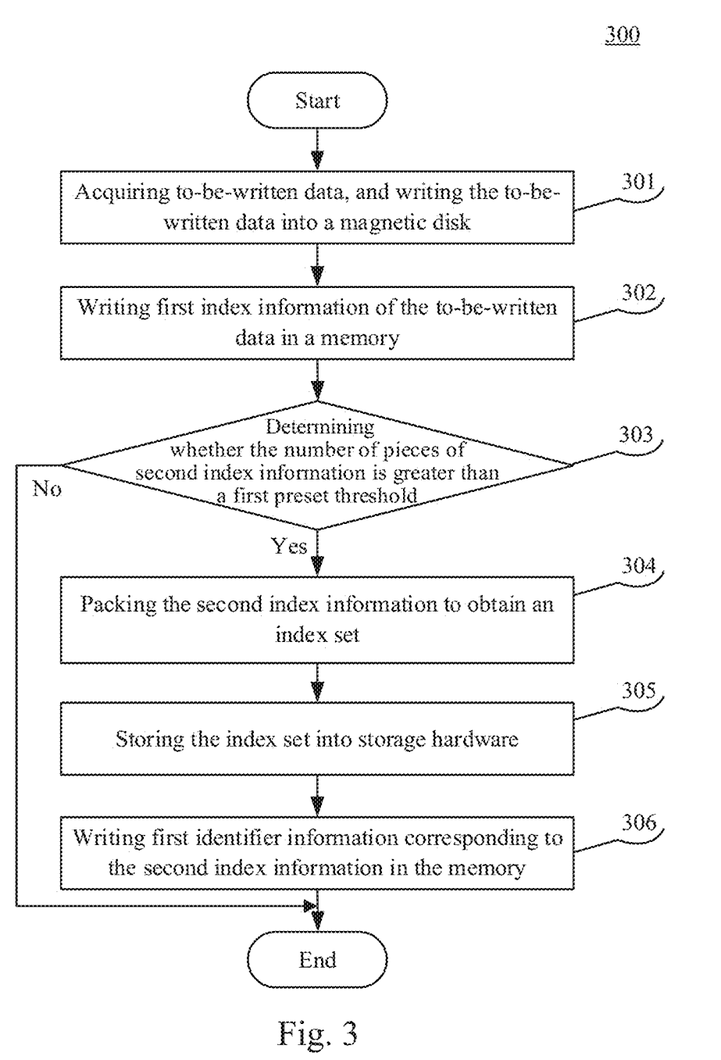
FIG. 3 is a flowchart of another embodiment of the method for writing data in an append mode according to the present disclosure.

Further referring to FIG. 3, FIG. 3 illustrates a flow 300 of another embodiment of the method for writing data in an append mode according to the present disclosure. The method for writing data in an append mode includes the following steps.

Step 301, acquiring to-be-written data, and writing the to-be-written data into a magnetic disk.

Step 302, writing first index information of the to-be-written data in a memory.

Steps 301-302 are substantially consistent with steps 201-202 in the foregoing embodiment. For the specific implementation, reference may be made to the foregoing descriptions of steps 201-202, and thus the details will not be repeatedly described here.

Step 303, determining whether the number of pieces of second index information is greater than a first preset threshold.

In this embodiment, an executing body (e.g., the server 105 shown in FIG. 1) of the method for writing data in an append mode first determines whether the number of the pieces of second index information in the memory is greater than the first preset threshold. Here, the first preset threshold may be set according to actual requirements, which is not limited in this embodiment. In the situation where the number of the pieces of second index information is greater than the first preset threshold, step 304 is performed.

In this embodiment, the executing body first determines whether the number of the pieces of second index information in the memory is greater than the first preset threshold, thereby determining whether the memory space is sufficient. If the number of the pieces of second index information is greater than the first preset threshold, it indicates that the memory space is not too much left. At this time, step 304 is performed to release the memory space.

In some alternative implementations of this embodiment, the process of writing the to-be-written data is ended in response to determining the number of the pieces of second index information is less than or equal to the first preset threshold.

In the implementations, when the number of the pieces of second index information is less than or equal to (i.e., not greater than) the first preset threshold, it indicates that there is a small amount of data in the memory, that is, there is a large amount of memory space left. At this time, the process of writing the to-be-written data can be directly ended.

Step 304, packing the second index information to obtain an index set.

In this embodiment, the executing body may pack the second index information to obtain the index set. Here, the second index information is at least one piece of index information of an adjacent logical address in a historical writing area. That is, in the situation where the number of the pieces of second index information is greater than the first preset threshold, the executing body packs the second index information, thus obtaining the index set. The second index information is the at least one piece of index information of the adjacent logical address in the historical writing area. Here, the historical writing area refers to an older area in the memory, that is, an area in which the index information is written earlier. The earlier the index information is written, the less likely the data corresponding to the index information is to be accessed in a short time. Therefore, the preset number of pieces of index information historically written in an older area can be packed according to a time. In addition, since the probability that the data of adjacent logical addresses is simultaneously accessed is large, the preset number of pieces of index information (second index information) of adjacent logical addresses in the historical writing area of the memory are packed, thereby improving the efficiency of data access.

Step 305, storing the index set into storage hardware.

In this embodiment, the executing body may store the index set obtained through the packing in step 304 into the log system of the storage hardware, and release the memory occupied by the packed index information in the memory, thereby releasing the memory space and increasing the speed of accessing the data. In addition, the data is written into the log system of the magnetic disk in the append mode, and the index information is written into the log system of the storage hardware in the append mode. Therefore, the isolation in terms of hardware avoids the mutual influence on the access performance of the two.

In some alternative implementations of this embodiment, the storage hardware is an Apache Pass (AEP). That is, the storage hardware in the implementations refers to the Apache Pass, abbreviated as AEP, and AEP is a persistent memory product based on a new storage medium 3D Xpoint by Intel Corporation, which can provide a read/write speed and delay close to a DRAM (Dynamic Random Access Memory), and have characteristics of a low delay and a high bandwidth. The AEP is compatible with a DDR4 (DDR4 RAM, DDR4 memory) slot, and the capacity of a single AEP has now reached 512G. The second index information in the memory is stored in the storage hardware, thereby ensuring the ultra-low delay in accessing the index information and improving the overall performance of the storage system.

Step 306, writing first identifier information corresponding to the second index information in the memory.

Step 306 is substantially consistent with step 204 in the foregoing embodiment. For the specific implementation, reference may be made to the foregoing description of step 204, and thus the details will not be repeatedly described here.

In some alternative implementations of this embodiment, the method for writing data in an append mode further includes: writing index information in the memory into the storage hardware in a form of a checkpoint according to a preset period, the checkpoint being used for a mark of reloading the index information from the storage hardware to the memory when a system is restarted.

In the implementations, an index (including index information and identifier information) in the memory is periodically written into the system of the storage hardware AEP in the form of the checkpoint. In this way, the index information can be loaded into the memory from the checkpoint that is most recently written into the AEP when the system is restarted, thereby avoiding reading all logs, and playing the role of a quick restart.

In addition, if the system is in between two checkpoints being written at the time of restart, the corresponding user data after the checkpoint most recently written into the AEP is determined from the AEP, the reconstruction of index information for the user data starts from the checkpoint most recently written into the AEP, and then the index information is written into the memory again, thereby improving the efficiency of data recovery.

In some alternative implementations of this embodiment, the method for writing data in an append mode further includes: segmenting a data stream in the magnetic disk and/or the storage hardware to obtain at least two data segments; and migrating, in response to determining that the number of holes in any data segment in the at least two data segments exceeds a second preset threshold, data and/or index information in the data segment to an end part of the data stream, and emptying space occupied by the data segment.

In the implementations, some holes may be generated in the data stream due to an operation such as a data (index information and identifier information) deletion or overwrite operation, which affects the space usage rate. Therefore, in the implementations, the log stream of the magnetic disk and the log stream of the AEP adopt the same method, that is, the log stream is segmented into a plurality of data segments. When the number of holes in any data segment is greater than the second preset threshold, that is, there is a large number of holes in any data segment, the data and/or index information in the data segment is migrated to the end part of the data stream, and then the old data segment is emptied, thereby completing the space cleaning, and further improving the space usage rate of the magnetic disk.

It can be seen from FIG. 3 that, as compared with the embodiment corresponding to FIG. 2, the method for writing data in an append mode in this embodiment emphasizes the step of comparing the number of the pieces of second index information with the first preset threshold and the step of performing the operations according to the comparison result. Accordingly, the index set obtained by packing the second index information is stored into the log system of the AEP, and the memory occupied by the packed index information in the memory is released, thereby releasing the memory space and increasing the speed of accessing the data. Meanwhile, the data is written into the log system of the magnetic disk in the append mode, and the index information is written into the log system of the storage hardware in the append mode. Therefore, the isolation in terms of hardware avoids the mutual influence on the access performance of the two. In addition, the quick restart can be realized by means of a checkpoint, and the space usage rate of the magnetic disk is improved by migrating the data segment.

Figure 4:
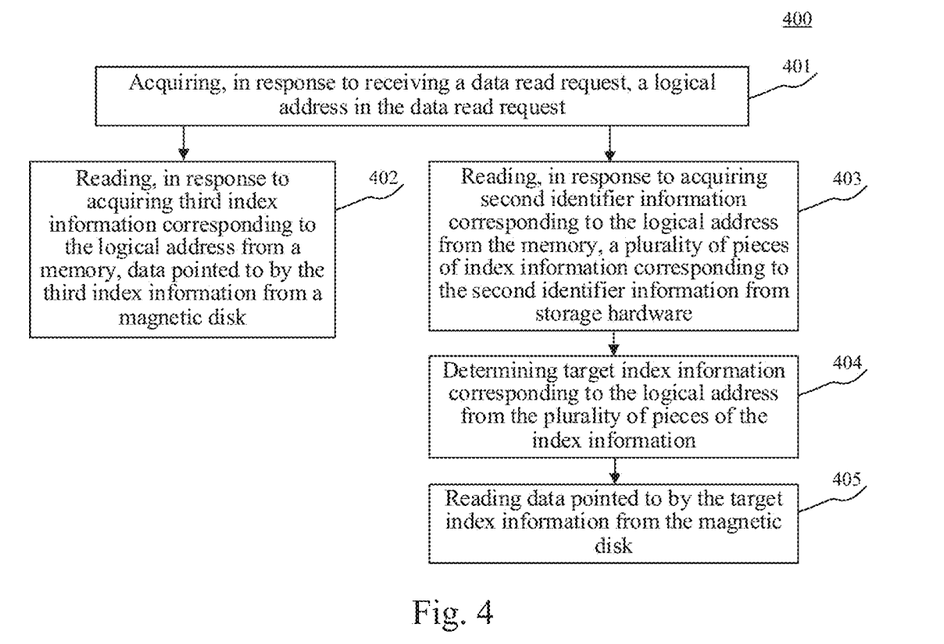
FIG. 4 is a flowchart of yet another embodiment of the method for writing data in an append mode according to the present disclosure.

Further referring to FIG. 4, FIG. 4 illustrates a flow 400 of another embodiment of the method for writing data in an append mode according to the present disclosure. The method for writing data in an append mode includes the following steps.

Step 401, acquiring, in response to receiving a data read request, a logical address in the data read request.

In this embodiment, an executing body (e.g., the server 105 shown in FIG. 1) of the method for writing data in an append mode may acquire the logical address in the data read request when receiving the data read request.

Step 402, reading, in response to acquiring third index information corresponding to the logical address from a memory, data pointed to by the third index information from a magnetic disk.

In this embodiment, the executing body determines whether corresponding index information or identifier information is found according to the logical address in step 401. If the third index information corresponding to the logical address is found in the memory, the executing body reads the data in the magnetic disk according to the pointing information of the index information, returns the read data to the user, and ends the data read process. Thus, reading the data according to the index information is implemented.

Step 403, reading, in response to acquiring second identifier information corresponding to the logical address from the memory, a plurality of pieces of index information corresponding to the second identifier information from storage hardware.

In this embodiment, if the second identifier information corresponding to the logical address is found in the memory, the executing body reads the plurality of pieces of index information corresponding to the second identifier information from the log system of the AEP.

Step 404, determining target index information corresponding to the logical address from the plurality of pieces of index information.

In this embodiment, the executing body determines the target index information corresponding to the logical address from the plurality of pieces of read index information.

Step 405, reading data pointed to by the target index information from the magnetic disk.

In this embodiment, since the index information is a mapping relationship between the logical address of the data and the real physical address of the data in the magnetic disk, the executing body reads the data in the magnetic disk according to the pointing information of the target index information determined in step 404, returns the read data to the user, and ends the data read process. Thus, reading the data according to the identifier information is implemented.

In some alternative implementations of this embodiment, empty data is returned in response to not acquiring the third index information or the second identifier information from the memory. In the implementations, if the executing body finds neither the third index information nor the second identifier information in the memory according to the logical address, the executing body considers that the logical address is erroneous, that is, there is no data corresponding to the logical address, and thus the executing body returns the empty data to the user, so that the user knows the data read result in time.

It can be seen from FIG. 4 that, as compared with the embodiment corresponding to FIG. 3, the method for writing data in an append mode in this embodiment emphasizes the data read process. In the method, it is implemented that the data is read according to the third index information or second identifier information corresponding to the logical address in the data read request, which improves the efficiency of reading the data and also improves the accuracy and completeness in reading the data.

Figure 5:
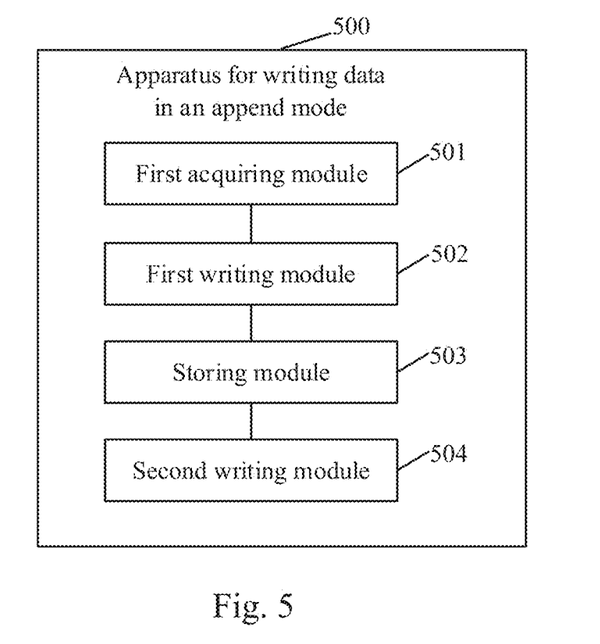
FIG. 5 is a schematic structural diagram of an embodiment of an apparatus for writing data in an append mode according to the present disclosure.

Further referring to FIG. 5, as an implementation of the method shown in the above drawings, the present disclosure provides an embodiment of an apparatus for writing data in an append mode. The embodiment of the apparatus corresponds to the embodiment of the method shown in FIG. 2. The apparatus may be applied in various electronic devices.

As shown in FIG. 5, the apparatus 500 for writing data in an append mode in this embodiment includes: a first acquiring module 501, a first writing module 502, a storing module 503, and a second writing module 504. Here, the first acquiring module 501 is configured to acquire to-be-written data, and write the to-be-written data into a magnetic disk. The first writing module 502 is configured to write first index information of the to-be-written data in a memory. The storing module 503 is configured to store, in response to determining that the number of pieces of second index information is greater than a first preset threshold, the second index information into storage hardware. Here, the second index information includes the first index information. The second writing module 504 is configured to write first identifier information corresponding to the second index information in the memory.

In this embodiment, for specific processes of the first acquiring module 501, the first writing module 502, the storing module 503 and the second writing module 504 in the apparatus 500 for writing data in an append mode, and their technical effects, reference may be respectively made to the relative descriptions of steps 201-204 in the corresponding embodiment of FIG. 2, and thus the details will not be repeatedly described here.

In some alternative implementations of this embodiment, the storing module includes: a packing submodule, configured to pack, in response to determining that the number of the pieces of second index information is greater than the first preset threshold, the second index information to obtain an index set, the second index information referring to at least one piece of index information of an adjacent logical address in a historical writing area; and a storing submodule, configured to store the index set into the storage hardware.

In some alternative implementations of this embodiment, the apparatus 500 for writing data in an append mode further includes: a performing module, configured to end, in response to determining that the number of the pieces of second index information is less than or equal to the first preset threshold, a process of writing the to-be-written data.

In some alternative implementations of this embodiment, the apparatus 500 for writing data in an append mode further includes: a second acquiring module, configured to acquire, in response to receiving a data read request, a logical address in the data read request; and a first reading module, configured to read, in response to acquiring third index information corresponding to the logical address from the memory, data pointed to by the third index information from the magnetic disk.

In some alternative implementations of this embodiment, the apparatus 500 for writing data in an append mode further includes: a second reading module, configured to read, in response to acquiring second identifier information corresponding to the logical address from the memory, a plurality of pieces of index information corresponding to the second identifier information from the storage hardware; an determining module, configured to determine target index information corresponding to the logical address from the plurality of pieces of index information; and a third reading module, configured to read data pointed to by the target index information from the magnetic disk.

In some alternative implementations of this embodiment, the apparatus 500 for writing data in an append mode further includes: a returning module, configured to return, in response to not acquiring the third index information or the second identifier information from the memory, empty data.

In some alternative implementations of this embodiment, the apparatus 500 for writing data in an append mode further includes: a third writing module, configured to write index information in the memory into the storage hardware in a form of a checkpoint according to a preset period, the checkpoint being used for a mark of reloading the index information from the storage hardware to the memory when a system is restarted.

In some alternative implementations of this embodiment, the apparatus 500 for writing data in an append mode further includes: a segmenting module, configured to segment a data stream in the magnetic disk and/or the storage hardware to obtain at least two data segments; and a migrating module, configured to migrate, in response to determining that the number of holes in a data segment in the at least two data segments exceeds a second preset threshold, data and/or index information in the data segment to an end part of the data stream, and empty space occupied by the data segment.

In some alternative implementations of this embodiment, the storage hardware is an Apache Pass (AEP).

According to an embodiment of the present disclosure, the present disclosure also provides an electronic device, a readable storage medium, and a computer program product.

Figure 6:
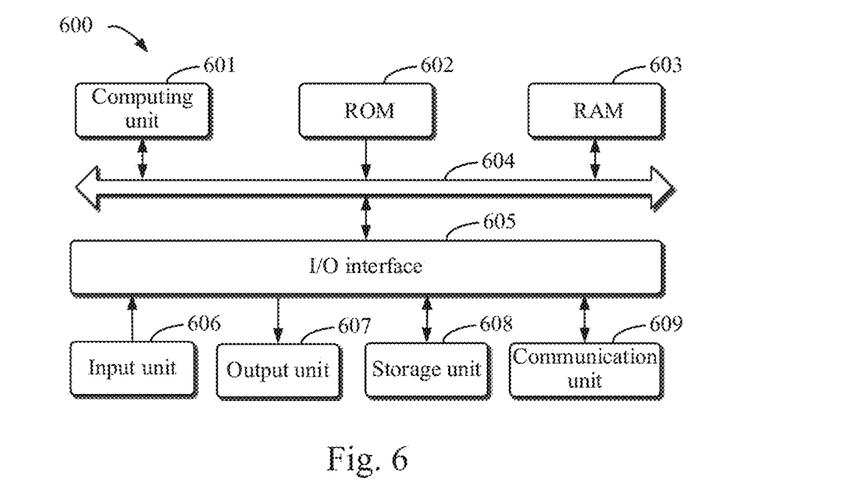
FIG. 6 is a block diagram of an electronic device used to implement the method for writing data in an append mode according to the embodiments of the present disclosure.

FIG. 6 illustrates a schematic block diagram of an example electronic device 600 for implementing the embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the device 600 includes a computing unit 601, which may perform various appropriate actions and processing, based on a computer program stored in a read-only memory (ROM) 602 or a computer program loaded from a storage unit 608 into a random access memory (RAM) 603. In the RAM 603, various programs and data required for the operation of the device 600 may also be stored. The computing unit 601, the ROM 602, and the RAM 603 are connected to each other through a bus 604. An input/output (I/O) interface 605 is also connected to the bus 604.

A plurality of parts in the device 600 are connected to the I/O interface 605, including: an input unit 606, for example, a keyboard and a mouse; an output unit 607, for example, various types of displays and speakers; the storage unit 608, for example, a disk and an optical disk; and a communication unit 609, for example, a network card, a modem, or a wireless communication transceiver. The communication unit 609 allows the device 600 to exchange information/data with other devices over a computer network such as the Internet and/or various telecommunication networks.

The computing unit 601 may be various general-purpose and/or dedicated processing components having processing and computing capabilities. Some examples of the computing unit 601 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 601 performs the various methods and processes described above, such as a method for writing data in an append mode. For example, in some embodiments, a method for writing data in an append mode may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computing unit 601, one or more steps of a method for writing data in an append mode described above may be performed. Alternatively, in other embodiments, the computing unit 601 may be configured to perform a method for writing data in an append mode by any other appropriate means (for example, by means of firmware).

Various embodiments of the systems and technologies described above can be implemented in digital electronic circuit system, integrated circuit system, field programmable gate array (FPGA), application specific integrated circuit (ASIC), application special standard product (ASSP), system on chip (SOC), complex programmable logic device (CPLD), computer hardware, firmware, software, and/or combinations thereof. These various embodiments may include being implemented in one or more computer programs that may be executed and/or interpreted on a programmable system including at least one programmable processor, which may be a dedicated or general programmable processor that may receive data and instructions from a storage system, at least one input device, and at least one output device, and transmit data and instructions to the storage system, the at least one input device, and the at least one output device.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In order to provide interaction with the user, the systems and techniques described herein may be implemented on a computer having: a display device for displaying information to the user (e.g., a CRT (cathode ray tube) or LCD (liquid crystal display) monitor); a keyboard and a pointing device (e.g., mouse or trackball), through which the user can provide input to the computer. Other kinds of devices can also be used to provide interaction with users. For example, the feedback provided to the user may be any form of sensory feedback (e.g., visual feedback, auditory feedback, or tactile feedback); and the input from the user can be received in any form (including acoustic input, voice input or tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

Cloud computing refers to accessing an elastically scalable shared physical or virtual resource pool through a network. Resources can include servers, operating systems, networks, software, applications or storage devices, etc. It is a technical system for deploying and managing resources in an on-demand, self-service manner Through cloud computing technology, it can provide efficient and powerful data processing capabilities for technical applications and model training of artificial intelligence, blockchain and the like.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, or a server of a distributed system, or a server combined with a blockchain.

It should be understood that the various forms of processes shown above may be used to reorder, add, or delete steps. For example, the steps disclosed in the present disclosure may be executed in parallel, sequentially, or in different orders, as long as the desired results of the technical solutions mentioned in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for writing data in an append mode, comprising:
    acquiring to-be-written data, and writing the to-be-written data into a magnetic disk;
    writing first index information of the to-be-written data in a memory;
    storing, in response to determining that a number of pieces of second index information is greater than a first preset threshold, the second index information into storage hardware, the second index information comprising the first index information; and
    writing first identifier information corresponding to the second index information in the memory.

2. The method according to claim 1, wherein the storing, in response to determining that a number of pieces of second index information is greater than a first preset threshold, the second index information into storage hardware comprises:
    packing, in response to determining that the number of the pieces of second index information is greater than the first preset threshold, the second index information to obtain an index set, the second index information being at least one piece of index information of an adjacent logical address in a historical writing area; and
    storing the index set into the storage hardware.

3. The method according to claim 2, further comprising:
    ending, in response to determining that the number of the pieces of second index information is less than or equal to the first preset threshold, a process of writing the to-be-written data.

4. The method according to claim 1, further comprising:
    acquiring, in response to receiving a data read request, a logical address in the data read request; and
    reading, in response to acquiring third index information corresponding to the logical address from the memory, data pointed to by the third index information from the magnetic disk.

5. The method according to claim 4, further comprising:
    reading, in response to acquiring second identifier information corresponding to the logical address from the memory, a plurality of pieces of index information corresponding to the second identifier information from the storage hardware;
    determining target index information corresponding to the logical address from the plurality of pieces of index information; and
    reading data pointed to by the target index information from the magnetic disk.

6. The method according to claim 5, further comprising:
    returning, in response to not acquiring the third index information or the second identifier information from the memory, empty data.

7. The method according to claim 1, further comprising:
    writing index information in the memory into the storage hardware in a form of a checkpoint according to a preset period, the checkpoint being used for a mark of reloading the index information from the storage hardware to the memory when a system is restarted.

8. The method according to claim 1, further comprising:
    segmenting a data stream in the magnetic disk and/or the storage hardware to obtain at least two data segments; and
    migrating, in response to determining that a number of holes in a data segment in the at least two data segments exceeds a second preset threshold, data and/or index information in the data segment to an end part of the data stream, and emptying space occupied by the data segment.

9. The method according to claim 1, wherein the storage hardware is an Apache Pass (AEP).

10. An electronic device, comprising:
    at least one processor; and
    a storage device, communicating with the at least one processor,
    wherein the storage device stores an instruction executable by the at least one processor, and the instruction, when executed by the at least one processor, causes the at least one processor to perform operations comprising:
    acquiring to-be-written data, and writing the to-be-written data into a magnetic disk;
    writing first index information of the to-be-written data in a memory;
    storing, in response to determining that a number of pieces of second index information is greater than a first preset threshold, the second index information into storage hardware, the second index information comprising the first index information; and
    writing first identifier information corresponding to the second index information in the memory.

11. The electronic device according to claim 10, wherein the storing, in response to determining that a number of pieces of second index information is greater than a first preset threshold, the second index information into storage hardware comprises:
    packing, in response to determining that the number of the pieces of second index information is greater than the first preset threshold, the second index information to obtain an index set, the second index information being at least one piece of index information of an adjacent logical address in a historical writing area; and
    storing the index set into the storage hardware.

12. The electronic device according to claim 11, wherein the operations further comprise:

ending, in response to determining that the number of the pieces of second index information is less than or equal to the first preset threshold, a process of writing the to-be-written data.

13. The electronic device according to claim 10, wherein the operations further comprise:

acquiring, in response to receiving a data read request, a logical address in the data read request; and reading, in response to acquiring third index information corresponding to the logical address from the memory, data pointed to by the third index information from the magnetic disk.

14. The electronic device according to claim 13, wherein the operations further comprise:

reading, in response to acquiring second identifier information corresponding to the logical address from the memory, a plurality of pieces of index information corresponding to the second identifier information from the storage hardware;

determining target index information corresponding to the logical address from the plurality of pieces of index information; and reading data pointed to by the target index information from the magnetic disk.

15. The electronic device according to claim 14, wherein the operations further comprise:

returning, in response to not acquiring the third index information or the second identifier information from the memory, empty data.

16. The electronic device according to claim 10, wherein the operations further comprise:

writing index information in the memory into the storage hardware in a form of a checkpoint according to a preset period, the checkpoint being used for a mark of reloading the index information from the storage hardware to the memory when a system is restarted.

17. The electronic device according to 16, wherein the operations further comprise:

segmenting a data stream in the magnetic disk and/or the storage hardware to obtain at least two data segments; and migrating, in response to determining that a number of holes in a data segment in the at least two data segments exceeds a second preset threshold, data and/or index information in the data segment to an end part of the data stream, and emptying space occupied by the data segment.

18. The electronic device according to claim 10, wherein the storage hardware is an Apache Pass (AEP).

19. A non-transitory computer readable storage medium, storing a computer instruction, wherein the computer instruction, when executed by a computer, causes the computer to perform operations comprising:

acquiring to-be-written data, and writing the to-be-written data into a magnetic disk;

writing first index information of the to-be-written data in a memory;

storing, in response to determining that a number of pieces of second index information is greater than a first preset threshold, the second index information into storage hardware, the second index information comprising the first index information; and writing first identifier information corresponding to the second index information in the memory.

20. The storage medium according to claim 19, wherein the storing, in response to determining that a number of pieces of second index information is greater than a first preset threshold, the second index information into storage hardware comprises:

packing, in response to determining that the number of the pieces of second index information is greater than the first preset threshold, the second index information to obtain an index set, the second index information being at least one piece of index information of an adjacent logical address in a historical writing area; and storing the index set into the storage hardware.

* * * * *

UNITED STATES PATENT AND TRADEMARK OFFICE
CERTIFICATE OF CORRECTION

| | | |
|---|---|---|
| PATENT NO. | : 11,947,842 B2 | Page 1 of 1 |
| APPLICATION NO. | : 17/896811 | |
| DATED | : April 2, 2024 | |
| INVENTOR(S) | : Zhengli Yi | |

It is certified that error appears in the above-identified patent and that said Letters Patent is hereby corrected as shown below:

In the Claims

Column 16, Line 1, Claim 17, delete "to 16," and insert -- to claim 16, --.

Signed and Sealed this
Twenty-fourth Day of September, 2024

Katherine Kelly Vidal
*Director of the United States Patent and Trademark Office*